United States Patent [19]

Ingle

[11] 3,992,591

[45] Nov. 16, 1976

[54] TELEPHONE LINE BATTERY BOOST CIRCUIT

[75] Inventor: Edwin Coy Ingle, Julian, N.C.

[73] Assignee: Bell Telephone Laboratories, Incorporated, Murray Hill, N.J.

[22] Filed: Apr. 25, 1975

[21] Appl. No.: 571,868

[52] U.S. Cl. .............................................. 179/16 F
[51] Int. Cl.² ...................... H04B 3/36; H04Q 1/30
[58] Field of Search ...................... 179/16 AA, 16 F

[56] References Cited
UNITED STATES PATENTS

| | | | |
|---|---|---|---|
| 3,757,052 | 9/1973 | Tothill | 179/16 F |
| 3,781,480 | 12/1973 | Roge | 179/16 F |
| 3,819,866 | 6/1974 | Hawley | 179/16 AA |
| 3,872,258 | 3/1975 | Chambers, Jr. | 179/16 F |
| 3,898,389 | 8/1975 | Hanneman et al. | 179/16 F |
| 3,906,162 | 9/1975 | Sparrevohn | 179/16 F |
| R27,680 | 6/1973 | McNair, Jr. | 179/16 F |

*Primary Examiner*—Kathleen H. Claffy
*Assistant Examiner*—Randall P. Myers
*Attorney, Agent, or Firm*—Thomas Stafford

[57] ABSTRACT

Transmission and signaling range of a telephone transmission line is extended by controllably inserting boost potentials into the line to series aid an applied central office battery. Insertion of the potentials is realized by sensing the direction of current flow in the line and switching a corresponding potential into the line. Optical couplers, each including a light emitting diode and an associated phototransistor, are employed as the line current sensing elements and switching elements.

12 Claims, 3 Drawing Figures

TELEPHONE LINE BATTERY BOOST CIRCUIT

BACKGROUND OF THE INVENTION

This invention relates to telephone systems and, more particularly, to range extenders for improving signaling and transmission on communications channels.

Numerous communications channels, for example, telephone transmission lines, consist of a twisted pair of leads. Signaling and transmission range of such transmission lines is limited by attenuation caused by the line resistance. The longer the line the greater the attenuation and, hence, the greater the distortion of telephone signaling and transmission.

Basically, signaling is the transfer of nonvoice information that controls processing of a telephone call, for example, signaling includes supervision, dial pulsing, ringing and ring-trip. The basic signaling problem in long transmission lines is that there may not be sufficient line current to assure operation of central office detection circuits, for example, relays and the like. Similarly, the basic transmission problem is loss of transmitter efficiency because of low "talk" battery current, i.e., low loop current. Various solutions have been proposed to overcome these difficulties.

One particularly advantageous solution to the line signaling and transmission problems is the polarity sensitive boost voltage insertion circuit disclosed in U.S. Pat. No. RE 27,680, issued to I. M. McNair, Jr., on June 19, 1973. Basically, the polarity of a central office battery potential applied to the leads of a transmission line is detected and a potential is inserted in the line to series aid the central office battery. Equal amplitude potentials are inserted in both leads of the line in an attempt to maintain longitudinal balance of the line impedance. Both voltage polarity sensing and current flow detection arrangements are disclosed. The voltage polarity sensing arrangement typically requires a shunt resistance connected between the leads of the line as a voltage sensing element and a fairly complex switching arrangement employing a plurality of transistors. Use of a shunt resistor is somewhat undesirable because of the loss of isolation between the tip and ring leads of the transmission line. In the current sensing arrangement, line current is employed to develop bias potentials to drive transistors for inserting appropriate boost potentials. Complementary transistor circuit arrangements are used to insert the potentials in both sides of the line.

Another problem with both the prior known voltage sensing and current sensing arrangements is so-called longitudinal imbalance of the transmission line. It is well known that long transmission lines develop 60 Hz hum signals on the individual leads. If the impedance of the leads is in balance, the hum signals will eventually be cancelled. Therefore, it is important that the impedance inserted into both leads of the line, when inserting the boost potentials, is substantially the same. If not, an imbalance results in the amplitude of the undesirable hum signals developed on the line. This imbalance in longitudinal hum signals is eventually converted into a so-called metallic current signal which degrades transmission quality over the line. The use of complementary transistors, i.e., NPNs in one lead and PNPs in the other lead, in the prior known arrangements to insert boost potentials into the line tends to cause undesirable longitudinal imbalance on the line.

Still another problem with prior known boost potential insertion arrangements relates to the insertion of potentials during the ringing cycle. It is important that the potential inserted in the transmission line series aid the central office battery during the ringing cycle. In practice, ringing is usually effected by applying a negative DC potential to the ring lead of a telephone transmission line and by superimposing a AC ringing signal thereon. Because of the relative amplitudes of the DC and AC potentials, the combined potential applied to the ring lead becomes positive during portions of the ringing interval. This positive transition appears to the range extender as an apparent reversal in polarity of the central office battery potential. Consequently, prior known insertion arrangements would reverse the inserted potential or potentials. Any such reversal of the inserted potential or potentials during ringing is undesirable because it would effectively buck the central office battery potential rather than series aid it and, therefore, interfere with the ring trip function of central office and/or subscriber equipment.

SUMMARY OF THE INVENTION

These and other problems are resolved in accordance with the inventive principles to be described herein in relation to a polarity sensitive transmission line battery boost voltage arrangement. Specifically, at least one predetermined potential is controllably insertable into a transmission line to series aid current flow of a first polarity in the line and at least one predetermined potential is controllably insertable into the transmission line to series aid current flow of a second polarity in the line. This controllable insertion of potentials is realized by employing directional current sensing arrangements and associated switching arrangements. At least one current sensing arrangement including an element for generating radiant energy in response to current flow of a first polarity in the transmission line is employed in combination with at least one switching arrangement including an element responsive to the radiant energy representative of current flow of the first polarity for connecting into the transmission line at least one potential to series aid the current flow of the first polarity. Similarly, at least one other current sensing arrangement including an element for generating radiant energy in response to current flow of a second polarity in the transmission line is employed in combination with at least one other switching arrangement including an element resonsive to the radiant energy representative of current flow of the second polarity for connecting into the transmission line at least one potential to series aid the current flow of the second polarity.

Another aspect of the invention relates to insertion of potentials into the transmission line during application of a ringing signal to the line. It is undesirable to have a reversal in the polarity of the inserted potentials during the ringing interval because of reversal in the polarity of current flow in the line caused by alternating positive and negative transitions of the ringing signal. This polarity reversal of the inserted potentials is avoided in accordance with an aspect of the invention by controllably disabling at least one of the current sensing arrangements and, hence, disabling the associated at least one switching arrangement during portions of the ringing interval.

In one embodiment of the invention, so-called optical couplers each including a light emitting diode and a phototransistor are employed as the radiant energy generating and potential connecting elements, respectively.

In one embodiment, equal amplitude potentials are controllably insertable into each lead of a transmission line to series aid current flow caused by a central office battery potential applied to the line so that longitudinal balance of the line is substantially mantained. This is achieved by employing current sensing arrangements for detecting current flow of both a first and second polarity in each lead of the line in combination with associated switching elements selectively to insert equal amplitude potentials in each lead of the line to series aid current flow in the line caused by the applied central office potential. The current sensors and switching arrangements are configured to have equal insertion impedance for both polarities of potentials to be inserted in the line.

BRIEF DESCRIPTION OF THE DRAWINGS

These and other objects and advantages of the invention will be more fully understood in the following detailed description of an embodiment of the invention taken in accordance with the appended drawings in which.

DETAILED DESCRIPTION

Figure 1:
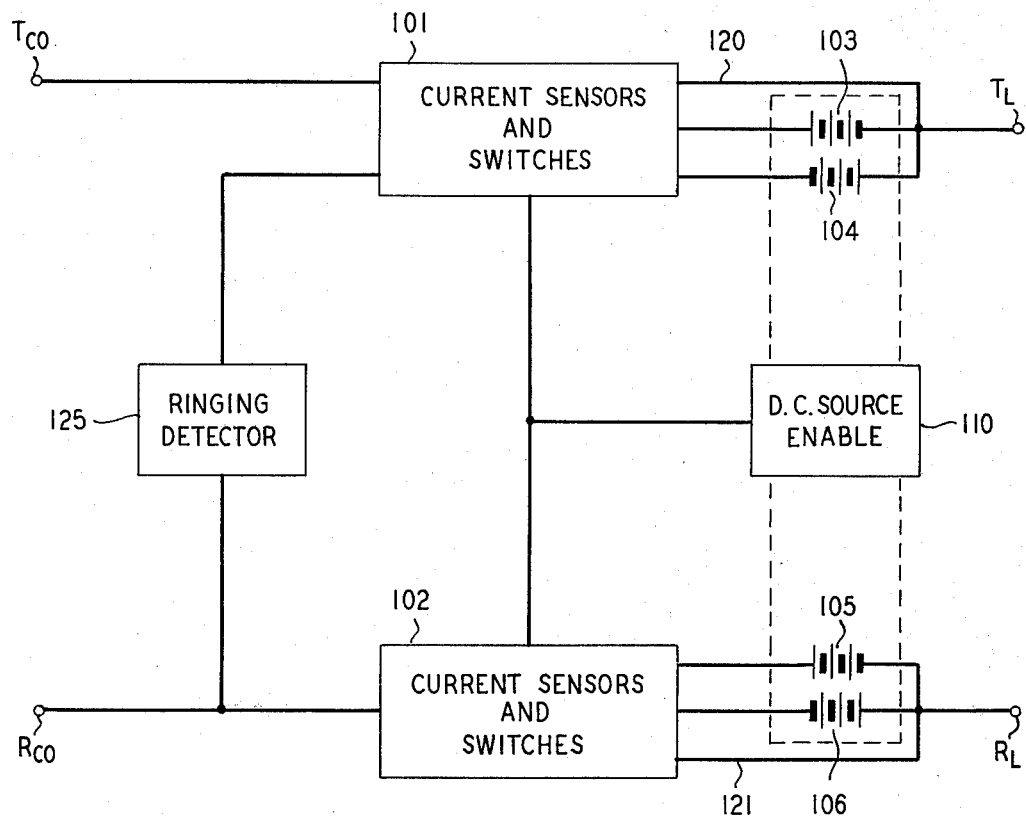
FIG. 1 shows a simplified block diagram of a central office battery boost potential insertion arrangement.

FIG. 1 shows in simplified form a transmission line range extender of the so-called polarity sensitive boost potential insertion type. As is well known, a telephone transmission line may consist of a twisted pair of leads, one of the leads being designated the tip (T) lead and the other lead being designated the ring (R) lead. At a central office (CO) potentials are applied to the tip and ring leads for purposes of signal transmission and signaling. In the course of signaling, the relative polarity of the potential applied across the tip and ring leads may be reversed. Additionally, during the ringing interval, an AC signal is superimposed on the applied DC potential. The signaling potentials are applied to the terminals of the range extender (FIG. 1) designated $T_{CO}$ and $R_{CO}$ corresponding to the tip and ring leads, respectively, of the transmission line. Range extenders are generally used in transmission lines typically employed to connect a subscriber to a central office. Such lines have come to be known as subscriber loops. On occasion, range extenders may also be employed in lines used for voice transmission between central offices. These lines will also be considered loops. Thus, the range extender terminals designated $T_L$ and $R_L$ are connected to the so-called subscriber loop and, hence, to the subscriber station equipment.

In order to enhance transmission quality and to operate devices at the central office, for example, relays and the like which are employed to detect operative states of the subscriber station equipment, it is important that there is sufficient current flow in the transmission line or loop. In long lines, the impedance of the line may attenuate the current from the central office battery to such a degree that the detecting devices do not respond properly to operative states of the subscriber station equipment. To avoid this detection problem, and to improve transmission quality, a potential or potentials are controllably inserted into the tip and/or ring leads of the transmission line to series aid the central office battery. To this end, current sensors and associated switches in units 101 and 102 are employed to detect current fow in the line and connect appropriate ones of potentials 103, 104, 105 and 106 into the corresponding tip or ring leads of the transmission line. Additionally, units 101 and 102 generate signals for enabling a power converter to generate potentials 103 through 106 only during intervals that line current is detected. DC source enable unit 110 is employed for this purpose.

In operation, a central office battery potential is applied to terminals $T_{CO}$ and $R_{CO}$. Thus, with a CO potential connected to terminals $R_{CO}$ and $T_{CO}$ poled so that $R_{CO}$ is negative relative to $T_{CO}$, and a so-called off-hook condition of the subscriber equipment, i.e., essentially a short circuit across the loop connected to terminals $T_L$ and $R_L$, current flow in the transmission line is in a direction from $T_{CO}$ to $T_L$ and from $R_L$ to $R_{CO}$. Consequently, current sensors in units 101 and 102 cause associated switching sensors in units 101 and 102 cause associated switching elements in those units to insert source 104 in the tip lead and source 105 in the ring lead, thereby series aiding the central office battery potential applied to terminals $R_{CO}$ and $T_{CO}$. Upon a reversal in the polarity of the central office battery potential, i.e., $R_{CO}$ positive relative to $T_{CO}$, and an off-hook condition of the subscriber station equipment, current flow is in a direction from $R_{CO}$ to $R_L$ and from $T_L$ to $T_{CO}$. Consequently, current sensors in units 101 and 102 enable associated switches in those units to insert source 103 into the tip lead and source 106 into the ring lead, again series aiding the applied central office battery. It is important that the magnitude of the inserted boost potential not be greater than the central office battery potential to insure that current flow in the line is determined by the applied central office battery and not by the inserted boost potential or potentials. In an example from practice, the magnitude of potentials 103 through 106 has been set at approximately 12 volts for a total inserted potential of 24 volts and the magnitude of the central office battery potential is typically 48 volts.

Figure 2:
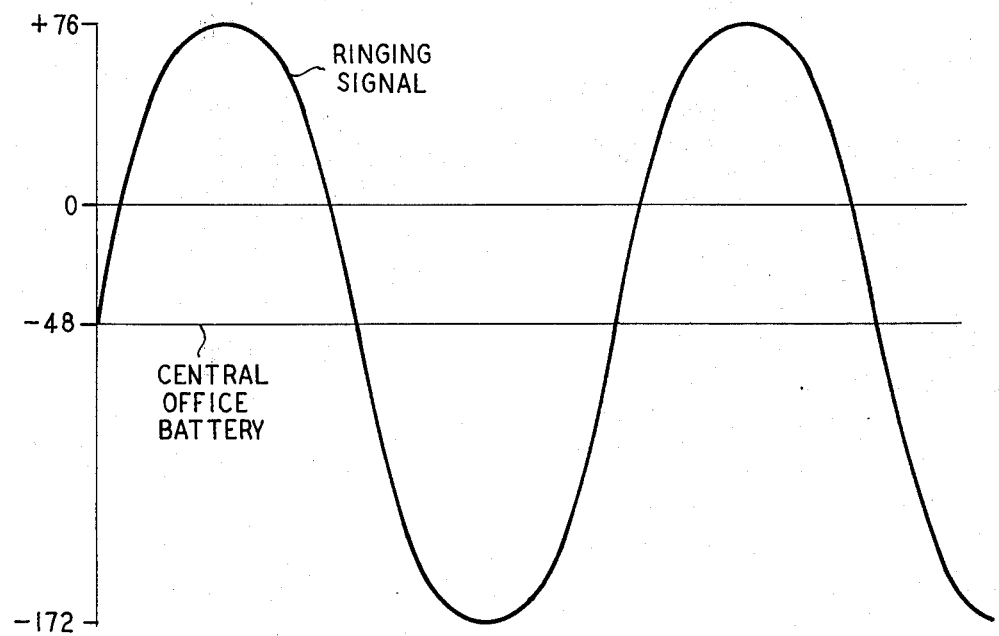
FIG. 2 illustrates a waveform useful in describing operation of one aspect of the invention.

During the ring interval, i.e., when a ringing signal is being supplied via a transmission line to a subscriber station equipment, a negative CO battery potential is usually applied to terminal $R_{CO}$ and an AC signal having a predetermined amplitude and frequency is intermittently superimposed thereon, as shown in FIG. 2. In an example from practice, ringing is realized by applying a negative 48 volt central office battery potential to terminal $R_{CO}$ and superimposing at 88 volt RMS AC ringing signal thereon, again as shown in FIG. 2. Thus, the combined signal applied to terminal $R_{CO}$ includes both negative and positive transitions during alternate cycles of the ringing signal. Since a negative central office battery potential is applied, only sources 104 and 105 (FIG. 1) should be inserted into the line to series aid the central office potential. However, the momentary positive transitions of the combined signal aplied to terminal $R_{CO}$ appears to the range extender as reversals in the polarity of the applied central office potential. Consequently, units 101 and 102 would normally cause a reversal in the polarity of the potentials inserted into the line. Any such polarity reversal in the inserted potentials is undesirable because the inserted potentials would effectively buck the applied central office potential and possibly cause signaling errors. This possible reversal in the polarity of the inserted potentials during ringing is avoided by employing ringing detector 125 to detect that an AC ringing signal is applied to $R_{CO}$ and to disable an appropriate one of the current sensors and associated switch in unit 101 during the ringing interval. In this example, disabling of the current sensor inhibits DC current flow in the transmission line during the positive transitions of the combined signal applied to terminal $R_{CO}$ and, hence, inhibits the insertion of potentials 103 and 106 into the line.

Figure 3:
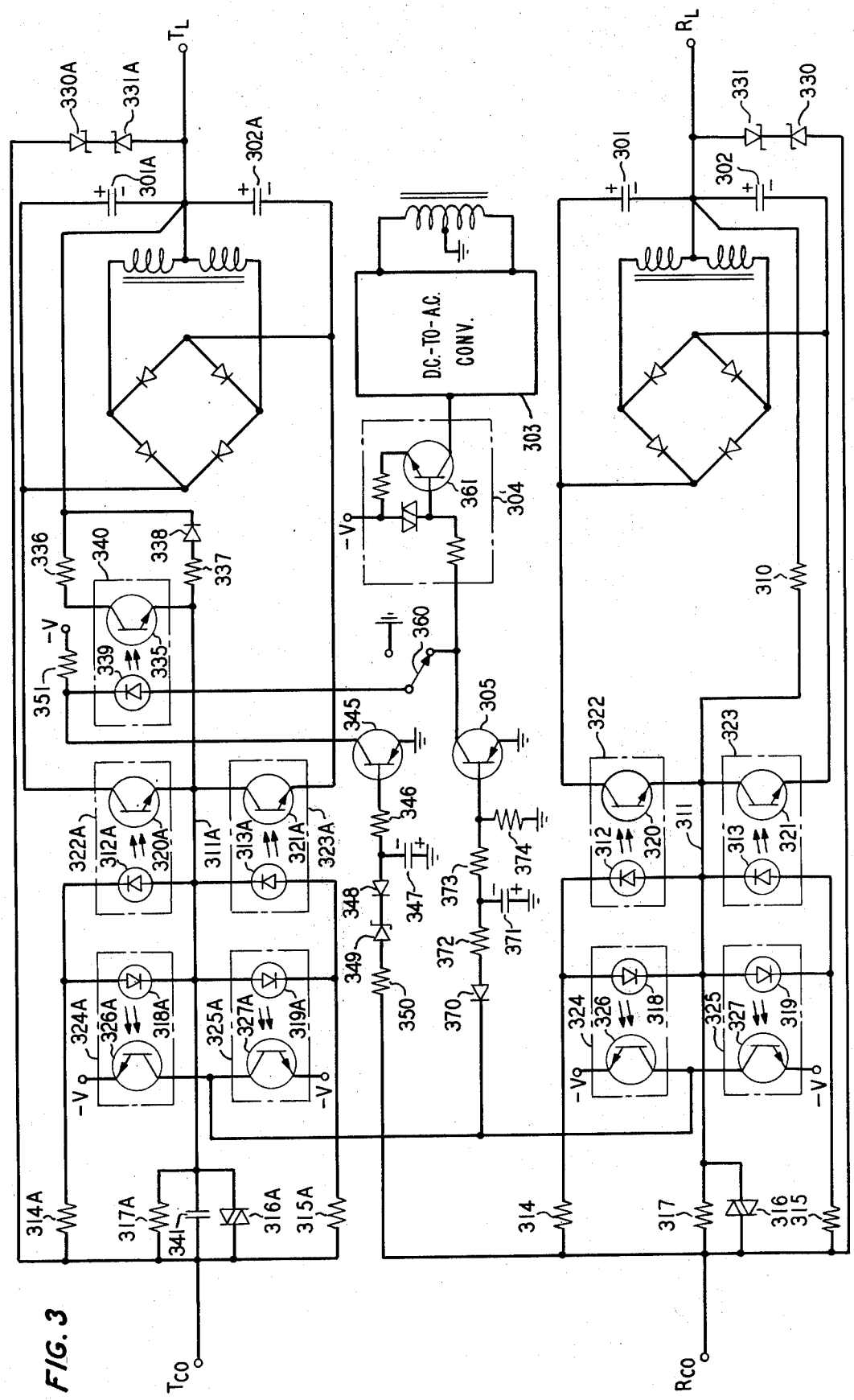
FIG. 3 shows details of a transmission line boost potential insertion arrangement illustrating one embodiment of the invention.

FIG. 3 shows details of one embodiment of a transmission line range extender of the polarity sensitive boost potential insertion type which illustrates the instant invention. The purpose of this embodiment of the instant invention is basically to insert controllably potentials into the tip and ring leads of a transmission line to series aid a central office battery potential applied across the tip and ring leads. The circuit arrangement employed to effect the desired controllable insertion of potentials into the ring lead is substantialy identical to that employed to insert the potentials into the tip lead except for some notable differences which are explained below. Circuit components employed in the circuit arrangement in the ring lead and circuit components employed in the circuit arrangement in the tip lead which are similar and perform similar functions are similarly numbered, with the tip lead components being designated A.

Referring now to FIG. 3, terminals $T_{CO}$ and $R_{CO}$ of the range extender are connected to the central office (CO) tip and ring leads, respectively, of a transmission line and terminals TL and RL are connected to the subscriber line or loop tip and ring leads, respectively, of a transmission line. Boost potentials 301, 302, 301A and 302A are developed across corresponding capacitors by employing DC-to-AC converter 303 and associated circuit components in well-known fashion. During idle intervals, i.e., when no current is flowing in the transmission line, converter 303 is inhibited by employing limiter 304 and transistor 305 to be discussed below. Appropriate ones of potentials 301, 302, 301A and 302A are selectively controllably insertable into the transmission line to series aid a central office battery potential applied to terminals $R_{CO}$ and $T_{CO}$. Thus, with a potential applied to $R_{CO}$ having a negative polarity relative to $T_{CO}$ current flow is from $T_{CO}$ to $T_L$ and from $R_L$ to $R_{CO}$ and potentials 302A and 301 should be inserted into the tip and ring leads, respectively, of the line to series aid the current flow caused by the CO potential. Similarly, with a CO potential applied to $R_{CO}$ and $T_{CO}$ having a positive polarity relative to $T_{CO}$, i.e., reverse battery condition, current flow is normally from $R_{CO}$ to $R_L$ and from $T_L$ to $T_{CO}$ and potentials 302 and 301A should be inserted into the ring and tip leads, respectively, of the line to series aid the applied CO potential.

The circuit arrangement employed to insert desired potentials into the ring lead will be considered first. Controllable insertion of potential 301 or potential 302 into the ring lead is realized by employing directional current sensors and associated switching arrangements. Circuit components used in the current sensors for detecting current flow in the ring lead include resistor 310, radiant energy emitting elements 312, 313, 318 and 319, and resistors 314 and 315. In this embodiment, radiant energy emitting elements 312, 313, 318 and 319 are light emitting diodes (LEDs). Since the LEDs are unidirectional conductive devices they emit radiant energy only in response to current flow of a predetermined polarity. For current flow from $R_{CO}$ to $R_L$, the current detection paths include resistor 310 connected between $R_L$ and circuit point 311 and the series connection of LED 318 and limiting resistor 314 connected between circuit point 311 and $R_{CO}$, and the series connection of LED 313 and limiting resistor 315 connected between circuit point 311 and $R_{CO}$. For current flow frm $R_L$ to $R_{CO}$, the current detection paths include resistor 310 and the series connection of LED 312 and resistor 314, and the series connection of LED 319 and resistor 315. The parallel connection of variolosser 316 and resistor 317 connected between $R_{CO}$ and circuit point 311 is employed to limit the magnitude of current passing through the LEDs in well-known fashion.

Switching arrangements associated with the LEDs include phototransistors 320, 321, 326 and 327. The individual LEDs and associated phototransistors are arranged in predetermined spatial relationship to form so-called optical couplers, now well-known in the art. Thus, LED 312 and phototransistor 320 constitute optical coupler 322, LED 313 and phototransistor 321-coupler 323, LED 318 and phototransistor 326-coupler 324 and, finally, LED 319 and phototransistor 327-coupler 325. Couplers 322 and 323 are employed to insert sources 301 and 302, respectively, in the ring lead while couplers 324 and 325 are employed to detect current flow in the line for purposes of enabling converter 303, to be explained below. Thus, phototransistors 320 and 321 respond to radiant energy emitted from LEDs 312 and 313, respectively, controllably to insert potentials 301 or 302, respectively, in circuit with the ring lead. In this example, phototransistors 320 and 321 are both of the NPN type. Accordingly, phototransistor 320 is connected to conduct current flow in a direction from $R_L$ to $R_{CO}$ and is operative controllably to connect the positive (+) side of potential 301 in circuit with circuit point 311 and, hence, terminal $R_{CO}$. Similarly, phototransistor 321 is connected to conduct current flow in a direction frm $R_{CO}$ to $R_L$ and is operative controllably to connect the negative (−) side of potential 302 in circuit with circuit point 311 and, hence, terminal $R_{CO}$. In operation, current flow of a predetermined magnitude through LEDs 312 and 313 causes them to emit sufficient radiant energy in order to turn on their associated phototransistors.

It is important to note that LEDs 324 and 325 are poled to conduct current of the opposite polarity relative to LEDs 312 and 313, respectively, for well-known reasons. It is not important which ones of the LEDs are connected in parallel so long as the LEDs in each parallel connection are poled to conduct currents of opposite polarity.

Zener diodes 330 and 331 are connected in a so-called back-to-back configuration between terminals $R_{CO}$ and $R_L$ and are employed to provide surge protection in well-known fashion.

Since phototransistors 320 and 321 are of the same conductivity type, i.e., both are NPN type, and since the current sensing and line current conductive paths include similar circuit components the impedance inserted into the ring lead for each polarity of potential is substantially the same. Consequently, longitudinal balance of the line is substantially maintained because the impedance is the same for each direction of current flow. Additionally, use of an LED and phototransistor connected in series as an inline current sensor and a controllable switch eliminates possible problems associated with some other transistor type insertion arrangements because no external bias potentials are required. In the instant invention, the radiant energy required to bias the phototransistor in an ON state is derived from the current flow in the transmission line.

Let us now turn to the circuit arrangement used to insert potentials 301A and 302A in circuit between terminals $T_{CO}$ and $T_L$ of the tip lead. Since the circuit elements labeled A provide the same circuit function as their counterparts used for inserting potentials 301 and 302 into the ring lead, they will not be discussed in detail. The differences between the tip lead boost potential insertion circuit and the ring lead boost potential insertion circuit relate to the current detection circuit paths. Specifically, in the tip lead potential insertion circuit the current detection paths include, in place in resistor 310, the serial connection of phototransistor 335 and resistor 336 connected in parallel with the serial connection of resistor 337 and diode 338. The impedance of each of the serial connections in substantially equal to the resistance of resistor 310. The parallel connection is connected in circuit between circuit point 311A and terminal $T_L$. The serial connection of resistor 337 and diode 338 is employed to provide a conduction path for current flow in a direction from circuit point 311A to terminal $T_L$ and the serial connection of resistor 336 and phototransistor 335 is employed controllably to provide a conduction path for current flow in a direction from $T_L$ to circuit point 311A. Conduction of phototransistor 335 is controlled by LED 339. Phototransistor 335 and LED 339 are arranged in predetermined spatial relationship to form optical coupler 340. Assuming for the moment that phototransistor 335 is ON, i.e., in a conductive state, operation of the circuit arrangement for insertion of potential 301A or potential 302A in circuit between $T_L$ and $T_{CO}$ is essentially identical to the circuit employed to insert potential 301 or 302 between $R_L$ and $R_{CO}$.

Capacitor 341 connected between $T_{CO}$ and circuit point 311A is employed to filter noise signals and other impulse signals in well-known fashion.

The current sensing and line current conduction paths of the boost potential insertion circuit used in the tip lead are substantially identical from an impedance standpoint to those of the ring lead insertion circuit. Consequently, the impedance inserted into the tip lead, for example, when potential 302A is inserted therein, is substantially the same as the impedance inserted into the ring lead when potential 301 is inserted therein. Similarly, the impedances associated with insertion of potential 301A in the tip lead and potential 302 in the ring lead are also substantially identical. Therefore, the impedance of the tip lead is maintained substantially identical to the impedance of the ring lead when inserting potentials in the transmission line to series aid an applied central office potential and, hence, longitudinal balance is maintained of the impedance in the leads of the transmission line.

Operation of coupler 340 to provide a current sensing path for current flow from $T_L$ to circuit point 311A is controlled primarily by transistor 345. LED 339 of coupler 340 is supplied current to emit radiant energy from source −V via limiting resistor 351. In some applications, LED 339 is disabled during idle intervals, i.e., intervals of no-line current, by transistor 305 being OFF while in other applications LED 339 is operative to emit radiant energy during idle intervals. Operation of LED 339 to emit radiant energy during idle intervals is realized by connecting circuit path 360 to ground potential. Transistor 345 controls LED 339 by controllably connecting the circuit junction between resistor 351 and LED 339 to ground potential, thereby effectively shunting current flow from source −V to ground potential and disabling LED 339.

Transistor 345 in conjunction with resistor 346, capacitor 347, diode 348, zener diode 349 and limiting resistor 350 form a so-called ringing signal detector. As indicated above, it is important that the boost potential insertion circuit be controlled so that there is no effective reversal in the polarity of inserted boost potentials during the ringing interval. That is to say, the applied central office DC potential is to be series aided during ringing and not bucked. This is realized in this embodiment by inhibiting detection of current flow in a direction which would cause such a reversal in the inserted potentials. In this example, ringing is effected by applying a DC potential, for example, 48 volts across $R_{CO}$ and $T_{CO}$ and such that $R_{CO}$ is negative (−) relative to $T_{CO}$, and by superimposing an AC signal thereon having a known amplitude, for example, 88 volts RMS as shown in the waveform of FIG. 2. Thus, conduction of current through the insertion circuit must be inhibited during intervals that the combined signal applied to $R_{CO}$ is positive relative to $T_{CO}$. Inhibiting current flow from $T_L$ to $T_{CO}$ and, hence, $R_{CO}$ to $R_L$, is realized by diabling optical coupler 340. To this end, the combined signal applied tp $R_{CO}$ is supplied via limiting resistor 350 zener diode 349. Zener diode 349 is selected to have a predetermined breakdown voltage, for example, 100 volts, in order to detect the presence of a ringing signal applied to $R_{CO}$. When the magnitude of the combined signal applied to $R_{CO}$ exceeds 100 volts, zener diode 349 breaks down and capacitor 347 is charged via diode 348 to a negative potential. The negative potential developed across capacitor 347 is supplied via resistor 346 to the base terminal of transistor 345, thereby causing transistor 345 to conduct. Transistor 345 effectively connects the circuit junction between resistor 351 and LED 339 to ground potential, turning LED 339 OFF. The discharge path of capacitor 347 includes resistor 346 and the base emitter juncton impedance of transistor 345. The impedance of the discharge path is selected so that transistor 345 remains ON and LED 339 remains OFF, disabling phototransistor 335, during the ringing interval. Thus, the current sensing path including phototransistor 335 for detecting current flow from $T_L$ to $T_{CO}$ is controllably disabled, i.e., effectively open circuited, during the ringing interval. This open circuiting insures, in accordance with an aspect of the invention, that the DC central office potential is series aided during the ringing interval by inhibiting insertion of potential 302 in the ring lead and potential 301A in the tip lead during portions of the ringing signal interval that the combined signal applied to $R_{CO}$ is positive. When the total signal applied to $R_{CO}$ is negative, potential 301 and potential 302A are inserted in the ring and tip leads, respectively, thereby series aiding the −48 volt CO potential.

DC-to-AC converter 303 is a so-called saturated core type well known in the art. It is employed to generate potentials 301, 302, 301A and 302A and to provide line current regulation by adjusting the magnitude of the inserted potentials in relationship with the magnitude of the current flow in the transmission line. This current regulation is achieved by employing limiter 304. Limiter 304 includes transistor 361 and associated bias circuit components. Operation of limiter 304 is straightforward. As is well known, the line current flowing in the tip and ring leads and, consequently, through the secondary windings of the output transformer of conveerter 303, is reflected back into the primary windings effectively loading converter 303. The component values of the biasing circuit of transistor 361 are selected so that when the line current exceeds a predetermined threshold value, for example, 40 milliamperes, the bias potentials developed cause transistor 361 to begin turning OFF. In turn, transistor 361 limits the magnitude of current flow to converter 303 and, thus, reduces the magnitude of the inserted potentials. Limiter 304 controls current flow to converter 303 to allow full magnitude boost potentials (12 volts) to be inserted into each lead of the line for line current values below the predetermined threshold value, to reduce the magnitude of the inserted potentials for line current values above the threshold and to limit the output of converter 303 to yield zero boost potential when the line current exceeds an upper limit value, for example, 60 milliamperes.

Limiter 304 and, hence, converter 303 is enabled and disabled by transistor 305. Simply, when transistor 305 is ON, transistor 361 of limiter 304 is enabled and current is supplied from source −V to converter 303 and when transistor 305 is OFF, transistor 361 is OFF cutting off the supply of current to converter 303. The operative states of transistor 305 are controlled by optical couplers 324, 325, 324A and 325A and circuit components including diode 370, capacitor 371 and resistors 372, 373 and 374. Couplers 324, 325, 324A and 325A are employed to detect current flow in the transmission line and to supply potential −V for gating transistor 305 ON and OFF. An ON phototransistor in one of the optical couplers effectively supplies potential −V via diode 370 and resistor 372 to charge capacitor 371 to a negative potential. The negative potential developed across capacitor 371 is supplied via resistor 373 to the base terminal of transistor 305 turning it ON. A discharge path for capacitor 371 includes resistor 373, resistor 374 and the base emitter impedance of transistor 305. The impedance of this discharge path is set at a predetermined value to realize a desired discharge time constant for capacitor 371. The time constant is selected at a predetermined value, for example, 250 milliseconds, to insure that converter 303 continues to be operative during dial pulsing. This, in turn, insures that the boost potentials continue to be inserted into the transmission line during dialing thereby series aiding the central office potential so that an adequate current level is maintained for operating dial detectors in the central office.

Since LED 339 is normally OFF during idle intervals, the current detection path including phototransistor 335 is disabled. Consequently, current flow is inhibited in a direction from $R_{CO}$ to $R_L$ in the ring lead and from $T_L$ to $T_{CO}$ in the tip lead. Therefore, optical couplers 324 and 325A are initially ineffective to enable converter 303 for generating potentials 302 and 301A to be inserted into the line. However, zener diode 330A conducts allowing LEDs 318 and 313 to emit sufficient radiant energy for enabling the associated phototransistors to conduct and, hence, turn ON converter 303.

The above described arrangements are, of course, merely illustrative of the application of the principles of this invention. Numerous other arrangements may be devised by those skilled in the art without departing from the spirit and scope of the invention. For example, other radiant energy emissive elements and radiant energy responsive elements may be equally employed for the purpose of sensing current flow and controllably inserting boost potentials into a transmission line. Moreover, the principles of this invention are equally applicable to boost potential insertion arrangements employing only one potential in each line of the type disclosed in U.S. Pat. No. 3,821,483, issued June 28, 1974.

What is claimed is:

1. In a transmission line range extender of the polarity sensitive boost potential insertion type including directional current flow detectors for controlling insertion of a potential or potentials into a lead or leads of the transmission line to series aid a direct current potential applied to the leads of the line, wherein the improvement comprises, means for inhibiting connection of potential into the line during a portion of each cycle of an applied alternating current ringing signal that the combined amplitudes of a direct current potential applied to the transmission line and the ringing signal exceed a prescribed amplitude level having a predetermined polarity opposite to the polarity of the applied central office direct current potential, wherein boost potential is insertable into the transmission line during the remaining portion of each cycle of the ringing signal.

2. A transmission line range extender as defined in claim 1 wherein said inhibiting means includes means for disabling current detection in a direction opposite to the normal current flow caused by the direct current potential applied to the line.

3. A transmission line range extender as defined in claim 2 wherein said inhibiting means includes means for detecting that a ringing signal has been applied to the line and means for providing a conductive path for detection of current flow in the line caused by the direct current potential applied to the line during intervals that no ringing signal is applied to the line and for inhibiting current flow in said conductive path only for current flow in a direction opposite to that caused by the applied direct current potential during intervals that a ringing signal is detected as being applied to the line.

4. A transmission line range extender as defined in claim 3 wherein said conductive path control means includes an optical coupler arranged to respond to a signal developed by said ringing detector for effectively open circuiting a path for detecting current flow in a direction opposite to current flow caused by said applied direct current potential.

5. A transmission line range extender which comprises, means responsive to current flow in a transmission line in a first predetermined direction for emitting radiant energy representative of the current flow in said first direction, means responsive to said emitted radiant energy indicative of current flow in said first direction for inserting at least one potential in said line to aid the flow of current in said first direction, means responsive to current flow in the transmission line in a second predetermined direction opposite to said first direction for emitting radiant energy representative of the current flow in said second direction, means responsive to said emitted radiant energy indicative of current flow in said second direction for inserting at least one potential in said transmission line to aid the flow of current in said second direction, and means for inhibiting insertion of potential into the transmission line only during a portion of each cycle of a ringing signal applied to the transmission line that the combined amplitude of an applied central office direct current potential and the ringing signal exceeds a prescribed level of a predetermined polarity opposite to the polarity of the applied central office direct current potential, wherein boost potential is insertable into the transmission line during the remaining portion of each cycle of the ringing signal.

6. A transmission line range extender as defined in claim 5 wherein said inhibiting means includes means for disabling said radiant energy emitting means responsive to current flow in said line in a direction opposite to the current flow caused by the central office direct potential applied to the line.

7. A transmission line range extender as defined in claim 6 wherein said disabling means includes means for detecting that a ringing signal has been applied to the line and means responsive to a signal developed by said ringing detector for effectively inhibiting current flow in said direction opposite to the current flow caused by the applied central office direct current potential.

8. A transmission line range extender as defined in claim 7 wherein said inhibiting means includes controllable means for effectively open circuiting a current path including said radiant energy emitting means thereby to inhibit connection of potential into the line.

9. A range extender as defined in claim 8 wherein said controllable means includes an optical coupler responsive to the signal from said ringing detector for inhibiting current flow to said radiant energy emitting means.

10. In a transmission line range extender of the polarity sensitive boost potential insertion type including detector arrangements for detecting the instantaneous direction of current flow in each lead of the transmission line caused by application of a direct current potential to the line and including arrangements for controllably inserting potential in each lead of the transmission line to aid the detected current flow caused by the applied direct current potential, wherein the improvement comprises:

first current detector means for detecting current flow in a first lead of the transmission line including first and second light emitting diodes arranged for emitting radiant energy representative of current flow in first and second directions, respectively;

second current detector means for detecting current flow in a second lead of the transmission line including first and second light emitting diodes arranged for emitting radiant energy representative of current flow in first and second directions, respectively;

first means responsive to radiant energy emitted from said first current detector means for controllably providing conductive paths to insert potentials into said first lead to series aid the detected direction of current flow, said first means consisting of first and second phototransistors associated with and connected on a one-to-one basis in series with said first and second light emitting diodes, respectively, of said first current detector means; and second means responsive to radiant energy emitted from said second current detector means for controllably providing conductive paths to insert potentials in said second lead to series aid the detected direction of current flow, said second means consisting of first and second phototransistors associated with and connected on a one-to-one basis in series with said first and second light emitting diodes, respectively, of said second current detector means, wherein said phototransistors are responsive to radiant energy emitted from said associated light emitting diodes for controllably inserting potentials into the leads of the transmission line to series aid the direct current potential applied to the line.

11. A range extender as defined in claim 10 wherein said phototransistors are all of the same conductivity type so that the impedance inserted into each lead of the transmission line when connecting a potential into each lead is substantially equal.

12. A range extender as defined in claim 11 wherein each of said phototransistor means is an NPN type phototransistor.

* * * * *